United States Patent [19]

Kurisu et al.

[11] Patent Number: 5,065,598
[45] Date of Patent: Nov. 19, 1991

[54] ICE THERMAL STORAGE APPARATUS

[75] Inventors: Yoshitaka Kurisu, Nagasaki; Hiroshi Kimura, Hyogo; Masakatsu Mukae, Nagasaki; Kazuyuki Aiba, Nagasaki; Yukihiro Hosaka, Nagasaki; Koichi Ohata; Tadaaki Nakano, both of Oosaka; Masaki Ikeuchi, Hyogo, all of Japan

[73] Assignee: Mitsubishi Denki Kabushiki Kaisha, Tokyo, Japan

[21] Appl. No.: 576,213

[22] Filed: Aug. 31, 1990

[30] Foreign Application Priority Data

Sep. 5, 1989 [JP] Japan .................................. 1-229519
Sep. 11, 1989 [JP] Japan .................................. 1-235180

[51] Int. Cl.$^5$ .............................................. F25D 3/00
[52] U.S. Cl. ......................................... 62/330; 62/59
[58] Field of Search ..................... 62/59, 330, 529, 66, 62/340

[56] References Cited

U.S. PATENT DOCUMENTS

| | | | |
|---|---|---|---|
| 1,969,187 | 8/1934 | Schutt | 62/59 X |
| 4,513,574 | 4/1985 | Humphreys et al. | 62/59 |
| 4,753,080 | 6/1988 | Jones et al. | 62/59 |
| 4,821,794 | 4/1989 | Tsai et al. | 62/59 X |
| 4,831,830 | 5/1989 | Swenson | 62/59 |

OTHER PUBLICATIONS

Okada et al., "Super Ice System", *Architectural Equipment and Piping Work*, vol. 26, No. 11 (Oct. 1988), pp. 127–130.
Mukushi et al., "Supercooling Degree in Inpipe Flow and Growth of Ice", *Collected Checical Engineering*, vol. 7, No. 5, (1981), pp. 449–453.

*Primary Examiner*—William E. Tapolcai
*Attorney, Agent, or Firm*—Burns, Doane, Swecker & Mathis

[57] ABSTRACT

An ice thermal storage apparatus that uses ice as a thermal storage material, wherein without using a brine that is a heat transfer medium for chilling water to form ice, a thermal storage material in the form of an aqueous solution to which an additive is added so that supercooling can be secured stably is supercooled to the freezing point or below directly by a refrigerating apparatus, the supercooled aqueous solution is made into ice in the form of sherbet by a desupercooling apparatus over a thermal storage tank, and the remaining thermal storage material having the freezing temperature that has not been made into ice is sent again into the refrigerating apparatus to form a cycle so that ice can be formed in the thermal storage tank continuously.

6 Claims, 3 Drawing Sheets

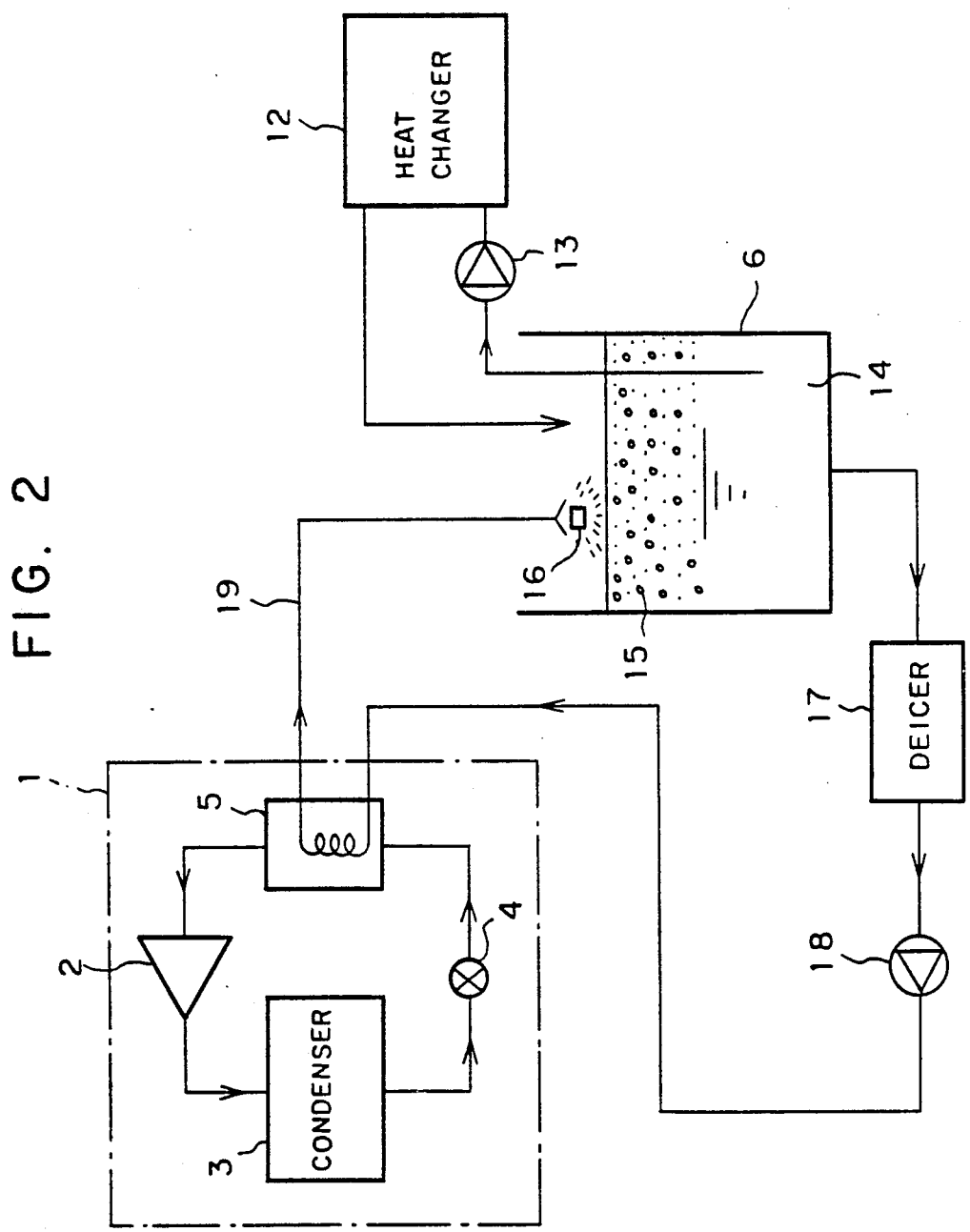

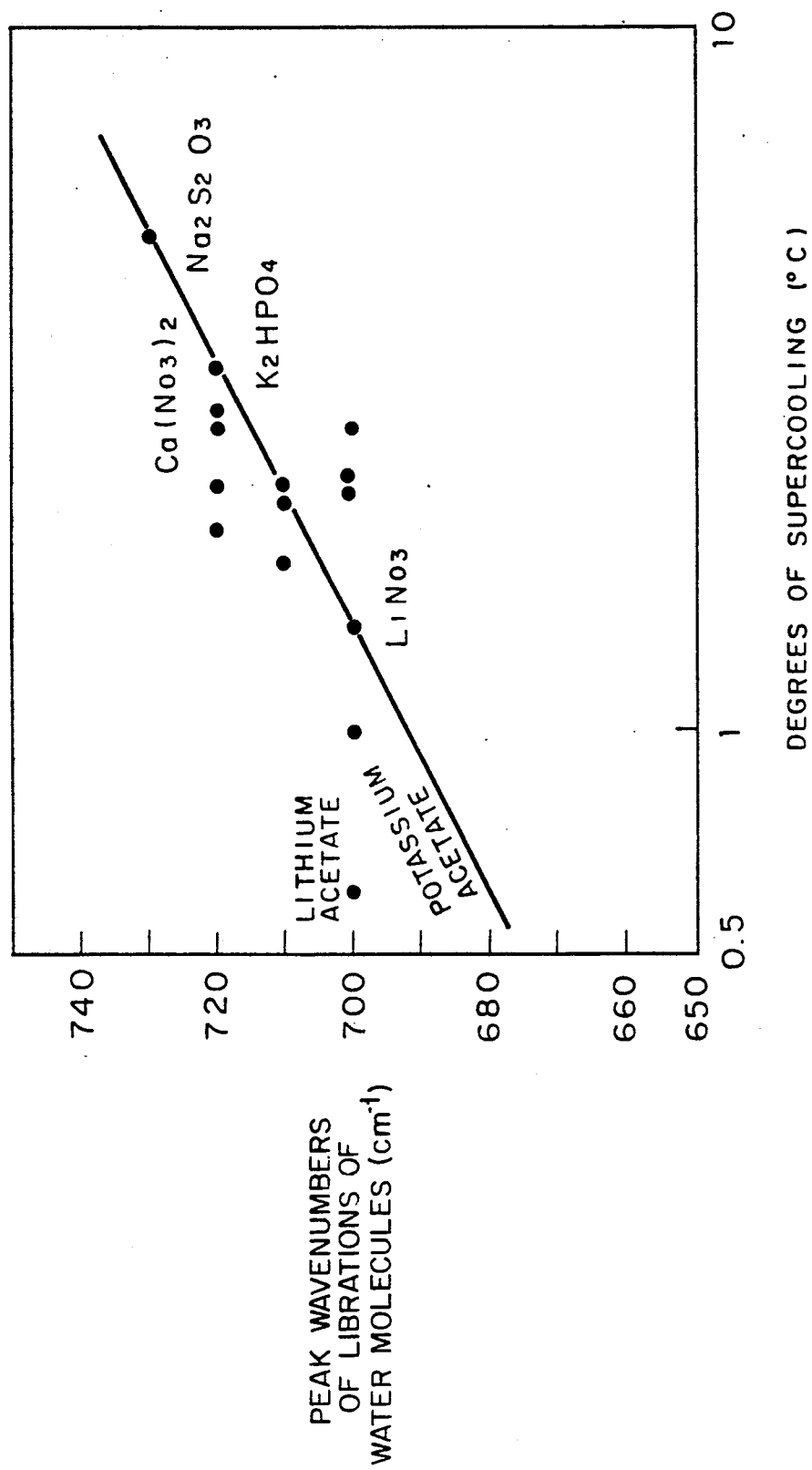

ICE THERMAL STORAGE APPARATUS

BACKGROUND OF THE INVENTION

1. Field of the Invention

This invention relates to an ice heat storage apparatus that uses ice as a thermal storage material and is used for air conditioning of buildings or is used for manufacturing or processing food that will be cooled or refrigerated at ice temperature.

2. Description of the Prior Art

FIG. 1 is a flow sheet showing a prior ice heat storage apparatus described, for example, in "Reito", Vol. 62, No. 715 (May 1982) published by Nihon Reito Kyokai, wherein a refrigerating machine indicated at 1 is equipped with as major constitutional elements a compressor 2, a condenser 3, a decompressing device 4, and an evaporator 5. Reference numeral 6 indicates a thermal storage tank for storing ice and water that serve as thermal storage material, reference numeral 7 indicates a brine piping for a brine such as ethylene glycol, reference numeral 8 indicates a heat transfer tube placed in the thermal storage tank 6, reference numeral 9 indicates a brine pump for circulating the brine, reference numeral 10 indicates chilled water placed in the thermal storage tank, reference numeral 11 indicates ice formed around the heat transfer tube 8, reference numeral 12 indicates a heat exchanger that is a cooling load such as an air handling unit, and reference numeral 13 indicates a chilled water pump for sending the chilled water 10 in the storage tank 6 into the heat exchanger 12.

Now, the operation will be described. The brine that has been cooled by the evaporator 5 of the refrigerating machine 1 to about $-10°$ C. is sent to the heat transfer tube 8 through the brine piping 7, and during the passage of the brine through the heat transfer tube 8, the water surrounding it is cooled. Part of water cooled to the freezing point or below freezes around the heat transfer tube 8 and forms ice 11. The brine which has exchanged heat with the chilled water 10 and whose temperature has risen is brought back to the evaporator 5 by the brine pump 9 so that it may be circulated.

The cooling operation by the above action is carried out at midnight when the electric charges are low, so that ice and water having a temperature of 0° C. are stored in the thermal storage tank 6. Generally, 40 to 50% of the total amount of the chilled water in the thermal storage tank 6 are stored as ice. Since the latent heat of ice is about 80 kcal/kg, which is about 80 times as high as the specific heat of water, ice can store a quantity of heat 32 to 40 times as large as the case wherein thermal storage is carried out using water having a temperature of 0° C. During the daytime, the chilled water in the thermal storage tank 6 is sent to the heat exchanger 12 by the chilled water pump 13, the temperature of the chilled water rises because it has cooled the cooling load, and it is brought back to the thermal storage tank 6. The ice in the thermal storage tank 6 melts gradually, and it gives its latent heat to the cooling load. Arrows in the figure indicate the directions of the flows of the fluids. Since the operation of the refrigerating machine 1 itself is the same as that of usual one, the description thereof is omitted.

Since the prior ice thermal storage apparatus is constituted as described above, a brine having a temperature of about $-10°$ C. is required to form ice, and it is needed to operate the refrigerating machine 1 in a low evaporating temperature range low in coefficient of performance. Further, as an ice layer grows around the heat transfer tube 8, the heat resistance between the brine and the chilled water becomes great, and since the brine temperature lowers, the coefficient of performance of the refrigerating machine 1 lowers further, and the power consumption increases. Furthermore, since it is needed that the heat transfer tube 8 of a material that is good in heat conductivity and expensive is placed in the thermal storage tank 6, the manufacturing cost of the thermal storage tank 6 becomes high. In the prior art, there was, for example, such a problem that when ice adhered around the heat transfer tube 8, it was feared that the expansion of the volume at the time of the solidification would damage the thermal storage tank 6 or the heat transfer tube 8, so that the rate of formation of ice in the thermal storage tank 6 had to be suppressed to about 50%.

SUMMARY OF THE INVENTION

The present invention has been made to solve the problems as mentioned above and an object of the present invention is to provide an ice thermal storage apparatus that requires no brine for the formation of ice, therefore can keep the coefficient of performance of a refrigerating machine high, does not permit the coefficient of performance to decrease with the formation of ice, and can reduce considerably the power consumption of the refrigerating machine A further object of the present invention is to provide an ice thermal storage apparatus that requires no heat transfer pipe in a thermal storage tank, can reduce considerably the manufacturing cost of the thermal storage tank, and also can make easily high the rate of formation of ice in the thermal storage tank.

In order to attain the above objects, according to a first aspect of the ice thermal storage apparatus of the present invention, without using a brine that is a heat transfer medium for chilled water to form ice, an aqueous solution to which an additive is added so that supercooling can be secured stably is supercooled to the freezing point or below directly by a refrigerating apparatus, the supercooled aqueous solution is made into ice in the form of sherbet by a desupercooling apparatus at top of a thermal storage tank, and the remaining aqueous solution having the freezing temperature that has not been made into ice is sent again into the refrigerating apparatus to form a cycle so that ice can be formed in the thermal storage tank continuously.

Thus, in the first aspect of the present ice thermal storage apparatus, the aqueous solution is cooled in an evaporator of the refrigerating machine to a supercooled state to several degrees Celsius below the freezing point. The supercool state of the aqueous solution is broken by the desupercooling apparatus at top of the thermal storage tank and is made into ice whose amount corresponds to the quantity of heat for the supercooling then the aqueous solution that has not been made into ice is supplied through a deicer or an ice filtering apparatus by a pump to the evaporator of the refrigerating machine. Ice is stored in the thermal storage tank with the ice floating in the aqueous solution.

In order to achieve the above objects, according to a second aspect of the ice thermal storage apparatus of the present invention, use is made of, as a thermal storage material, an aqueous solution that contains a specified material in a specified concentration and is easily supercooled. The material that will be added to water as thermal storage material comprises one or more materials selected from the inorganic material group consisting of sodium formate (HCOONa), potassium formate (HCOOK), sodium acetate ($CH_3COONa$), magnesium acetate [$(CH_3COO)_2Mg$], potassium nitrate ($KNO_3$), calcium nitrate [$Ca(NO_3)_2$], sodium thiosulfate ($Na_2S_2O_3$), dipotassium hydrogen phosphate ($K_2HPO_4$), and urea [$(NH_2)_2CO$] or one or more materials selected from the organic material group consisting of gelatin, carboxymethylcellulose sodium salt, polyethylene glycol, and methyl cellulose, and the inorganic material or the organic material is dissolved in water in a concentration of 0.05 to 0.5 wt. %.

Thus, in the second aspect of the present ice thermal storage apparatus, use is made of, as a thermal storage material, an aqueous solution that contains a specified inorganic material or an organic material in a specified concentration as described above and is easily supercooled. This aqueous solution can be brought to a supercooled state with very good reproducibility and therefore can keep a supercooled state during cooling by a refrigerating machine to allow efficient cooling operation, and when the aqueous solution is introduced in the thermal storage tank, by braking the supercooled state by using a cold finger or the like to form ice, the heat transfer coefficient can be prevented from lowering and the coefficient of performance of the refrigerating machine can be kept high.

In order to achieve the above objects, according to a third aspect of the present ice thermal storage apparatus, use is made of, as a thermal storage material, an aqueous solution that contains both one or more materials selected from the above inorganic material group and one or more materials selected from the above organic material group that are dissolved therein with the total amount of them being 0.1 to 0.8 wt. %.

Thus, in the third aspect of the present ice thermal storage apparatus, use is made of, as a thermal storage material, an aqueous solution that contains both one or more materials selected from the above inorganic material group and one or more materials selected from the above organic material group in specified concentrations. In comparison with the aqueous solution containing either the inorganic material(s) or the organic material(s), the aqueous solution containing both the inorganic material(s) and the organic material(s) forms easily a more stable supercooled state.

The above objects and other objects and novel features of the present invention will become more apparent in the following detailed description which is to be read in connection with the attached drawings The drawings are intended for explanation only and are not intended to limit the scope of the invention.

BRIEF DESCRIPTION OF THE DRAWINGS

FIG. 2 is a flow sheet of an ice thermal storage apparatus according to one embodiment of the present invention; and FIG. 3 is a graph showing the relationship between the infrared absorption spectrum of the aqueous solutions containing various additives and the peak wavenumbers of vibrations of the water molecules.

DETAILED DESCRIPTION OF THE PREFERRED EMBODIMENTS

Figure 1:
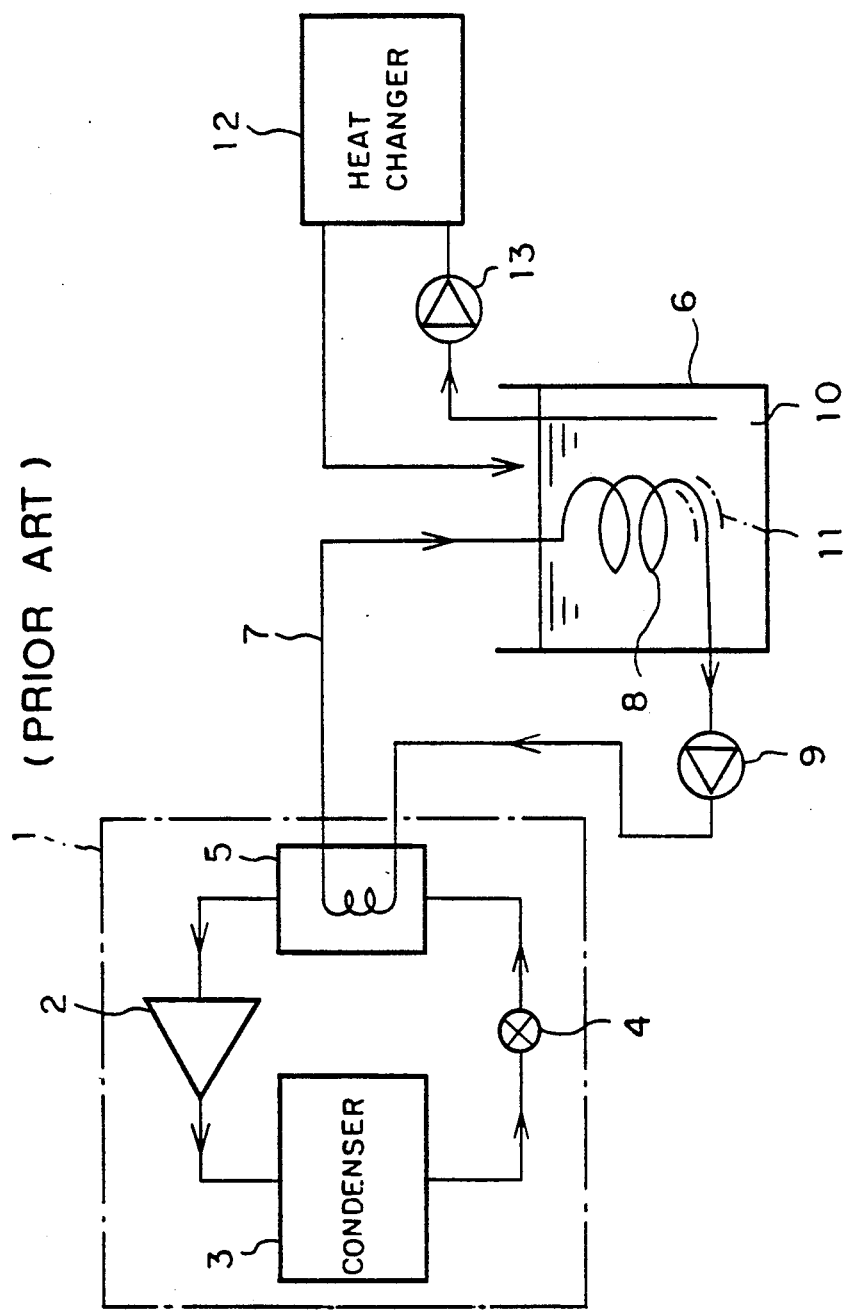
FIG. 1 is a flow sheet showing a prior ice thermal storage apparatus.

Now, suitable embodiments of the present invention will be described in more detail with reference to the attached drawings.

In the flow sheet of the present ice thermal storage apparatus shown in FIG. 2, reference numeral 1 indicates a refrigerating machine equipped with a compressor 2, a condenser 3, a decompressing device 4, and an evaporator 5. Reference numeral 6 indicates a thermal storage tank. A thermal storage material 14 held in the thermal storage tank 6 is an aqueous solution containing an additive that secures supercooling stably such as a potassium salt or a sodium salt. The aqueous solution will be described later. Reference numeral 15 indicates ice floating in the aqueous solution (14), and reference numeral 16 indicates a desupercooling apparatus located near the outlet of the supercooled aqueous solution and comprising for example an ice mass with a prescribed size. Reference numeral 17 indicates a deicer that is a filter for filtering ice 16 in the aqueous solution 14, reference numeral 18 indicates a pump for circulating the aqueous solution 14, and reference numeral 19 indicates a piping for leading the aqueous solution 14 supercooled by the evaporator 5 to the thermal storage tank 6.

Now, the operation will be described.

The aqueous solution 14 supercooled to several degrees Celsius below the freezing point (to about $-2°$ C.) by the evaporator 5 of the refrigerating apparatus 1 is led by the piping 19 and is brought in contact with the desupercooling apparatus 16 located near the outlet of the piping 19 over the thermal storage tank 6 such as a small-capacity device for generating a low temperature of about $-5°$ C., so that the supercooled state thereof is broken, and pieces of ice 15 whose amount corresponds to the quantity of the heat of the supercooling flow together with the remaining aqueous solution 14 into the thermal storage tank 6. The ice 15 floats in the upper part of the aqueous solution 14 having the freezing temperature in the thermal storage tank 6. The aqueous solution 14 in the lower part of the thermal storage tank 6 is sent through the filter 17 for the ice to the refrigerating machine 1 by the pump 18 thereby completing a cycle.

In this way, small pieces of ice are continuously formed in the thermal storage tank 6 and the occupancy rate of the ice in the thermal storage tank 6 increases. The thermal storage operation described above is carried out at midnight when the power charges are low so that heat is stored in the form of ice, and in order to use this heat for cooling or the like, in the daytime, the aqueous solution of the freezing temperature is sent to the heat exchanger 12 by the pump 13 and the aqueous solution whose temperature has risen is brought back to the thermal storage tank 6 to allow the ice 16 to melt so that the latent heat may be utilized.

In the above embodiment, a filter for filtering ice is provided so that it may be prevented that the ice in the aqueous solution flows into the refrigerating machine, and the ice acts as nucleus to form ice in the refrigerating apparatus to damage the refrigerating machine, but instead of the filter a heating apparatus for melting ice nuclei may be provided. Further, the desupercooling apparatus may be placed in the aqueous solution in the thermal storage tank. It is a matter of course that if the aqueous solution of the freezing temperature is used for cooling or the like, it is possible that a piping for bypassing from a heat exchanger outlet for cooling to the pump suction and a flow rate control valve are provided so that the temperature of the aqueous solution flowing into the heat exchanger may be suitably adjusted.

The aqueous solution 14 that can be used as thermal storage material in the present invention is an aqueous solution containing one or more materials selected from the inorganic material group consisting of sodium formate (HCOONa), potassium formate (HCOOK), sodium acetate ($CH_3COONa$), magnesium acetate [$(CH_3COO)_2Mg$], potassium nitrate ($KNO_3$), calcium nitrate [$Ca(NO_3)_2$], sodium thiosulfate ($Na_2S_2O_3$), dipotassium hydrogen phosphate ($K_2HPO_4$), and urea [$(NH_2)_2CO$] and/or one or more materials selected from the organic material group consisting of gelatin, carboxymethylcellulose sodium salt, polyethylene glycol, and methyl cellulose in a concentration of 0.05 wt. % or over.

Sample aqueous solutions containing 0.1 wt. % of these additives respectively were prepared, and the solidifying temperature, the degree of supercooling, and the melting point of each of these aqueous solutions were determined by using a differential scanning calorimeter (DSC). The results are shown in Table 1. For comparison, the results of measurement of lithium acetate ($CH_3COOLi$), potassium acetate ($CH_3COOK$), lithium nitrate ($LiNO_3$), and polyvinyl alcohol are also entered in the Table 1. The degree of supercooling of each aqueous solution was found from the difference between the solidifying temperature of deionized water and that of the sample.

TABLE 1

Sample
Deionized water
Tap water
Sodium formate (HCOONa)
Potassium formate (HCOOK)
Lithium acetate ($CH_3COOLi$)*
Sodium acetate ($CH_3COONa$)
Potassium acetate ($CH_3COOK$)*
Magnesium acetate [$(CH_3COO)_2Mg$]
Lithium nitrate ($LiNO_3$)*
Calcium nitrate [$Ca(NO_3)_2$]
Sodium thiosulfate ($Na_2S_2O_3$)
Dipotassium hydrogen phosphate ($K_2HPO_4$)
Urea [$(NH_2)_2CO$]
Gelatin
Carboxymethylcellulose sodium salt
Polyethylene glycol
Methyl cellulose
Polyvinyl alcohol*
Average value of solidifying temperature (°C.)
Degree of supercooling (°C.)
Melting point (°C.)

*Comparative Example outside the scope of the present invention

As apparent from Table 1 above, aqueous solutions that can be used in the present invention are those having a degree of supercooling of about −2° C.

The infrared absorption spectrum of each of the aqueous solutions listed in Table 1 was measured. The relationship between the peak wavenumbers of librations of the water molecules and the degrees of supercooling shown in Table 1 is shown in FIG. 3 as a logarithm-logarithm graph. As apparent from FIG. 3, it can be said that there is a high mutual relation between these parameters. That is, it can be understood that the additive dissolved in water brings about its supercooled stability depending on the extent of the action on the libration of water molecules sensitive to changes of the surrounding environment.

It was confirmed, by circulating a few litters of each sample solution through the refrigerating machine, that the degree of supercooling shown in Table 1 measured by a calorimeter (allowing tens mg of samples to stand) was almost reliable practically. In practice, many aqueous solutions could stably be circulated and cooled to the degree of supercooling shown in Table 1. When the degree of supercooling was lowered, the supercooled state was broken suddenly during the circulation, some samples begun to freeze.

According to the results of experiments, it was found that a desired degree of supercooling could be obtained by an aqueous solution containing 0.05 to 0.5 wt. % of one or more materials selected from the above-mentioned inorganic material group or one or more materials selected from the above-mentioned organic material group. Although it is also possible to apply 0.5 wt. % or over, it is not preferable because the supercooled stability increases too much so that making ice from the supercooled state becomes difficult and it becomes not economical in view of the cost of the additive.

If it is desired to produce a more stable supercooled state, a mixture of one or more materials selected from the inorganic material group with one or more materials selected from the organic material group brings about a more favorable result. This case results in a synergistic effect of them, and in some cases, a desired effect can be obtained even if the total amount of the added materials is smaller than that of the case where only one additive is used. In this case of combination, the lower limit of the concentration for obtaining a desired effect is 0.05 wt. %, and a concentration of 0.8 wt. % or below can provide a practically adequate effect.

The results of experiments for the confirmation of the supercooling effect of aqueous solutions each containing one inorganic material and one or more organic materials are shown below. However, the figures given below cannot be compared directly with the figures shown in Table 1 because the experimental conditions were different.

| Inorganic material | Organic material | Supercooling effect on deionized water |
|---|---|---|
| $K_2HPO_4$ (0.1%) | without | 0.7° C. |
| $K_2HPO_4$ (0.1%) | Carboxymethylcellulose sodium salt | 1.1° C. |
| $K_2HPO_4$ (0.1%) | Polyethylene glycol | 0.0° C. |
| without | | 1.3° C. |

In an actual operation, an aqueous solution having a desired degree of supercooling is used, and after passing it through a refrigerating machine, it is passed into the thermal storage tank with it being at a prescribed degree of supercooling. The desupercooling can be conducted efficiently for example by a cold finger cooled to about −5° C. or a Peltier effect (electronic refrigeration) element or by using a method wherein a suitable nucleus forming material is employed or a method wherein a suitable electrode is employed. A supercooled state is only a metastable state in view of thermodynamics, and once the supercooled state is broken, freezing begins and the initial supercooled state will never be restored again.

Since the produced ice crystals are always resulted from the deposition from an aqueous solution containing an additive(s), the part adjacent to the ice crystal surface is always covered with a thin film of the aqueous solution containing an additive(s) in a high concentration, and the ice crystal would not adhere easily to the adjacent other ice crystal. As a result, even if the rate of production of ice increases, hard masses of ice are not formed, and isolated ice crystals continue to accumulate. Consequently, there is no fear that the thermal storage tank will be damaged.

As described above, according to the present invention, since an aqueous solution is supercooled directly by a refrigerating machine to several degrees Celsius below the freezing point and ice is formed therefrom by a desupercooling apparatus, a low-temperature brine for cooling an aqueous solution is not required, and there is an effect that an ice thermal storage apparatus can be obtained wherein the coefficient of performance of the refrigerating apparatus can be kept high and the efficient is high. Further, since a heat exchanger for producing ice in the thermal storage tank is not needed, there is an effect that an ice thermal storage apparatus can be obtained wherein the thermal storage tank can be made inexpensive and an existing chilled water thermal storage tank can be utilized easily.

Further, according to the present invention, since an aqueous solution that is made to be easily brought to a supercooled state by the addition of a specified additive is supercooled directly in a refrigerating machine to several degrees Celsius below the freezing point and it is led over a heat storage tank to form ice, there is an effect that an ice head storage apparatus can be obtained wherein a brine for cooling water that was needed in the prior apparatus becomes unrequired, the coefficient of performance of the refrigerating apparatus can be kept high, and the efficiency is high.

What is claimed is:

1. An ice thermal storage apparatus which comprises a refrigerating apparatus made up of a compressor, a condenser, a decompressing device, and an evaporator, a thermal storage material in the form of an aqueous solution prepared by adding an additive or additives to water that will be supercooled by said refrigerating apparatus, a desupercooling apparatus for relieving the supercooled state of said thermal storage material to form ice that is provided in the circuit of said thermal storage material, a thermal storage tank for storing said aqueous solution and said ice formed by said desupercooling apparatus, a pump for sending said thermal storage material in said ice thermal storage tank into the evaporator of said refrigerating apparatus that is provided in the circuit of said thermal storage material, and a deicer for removing ice in the thermal storage material that is situated upstream of said pump.

2. An ice thermal storage apparatus as claimed in claim 1, wherein said deicer is a filter for filtering ice.

3. An ice thermal storage apparatus as claimed in claim 1, wherein said deicer is a heating apparatus for melting ice nuclei.

4. An ice thermal storage apparatus as claimed in claim 1, wherein said desupercooling apparatus is placed in the thermal storage material in said thermal storage tank.

5. An ice thermal storage apparatus which comprises a thermal storage tank holding a thermal storage material, a thermal storage material introducing means of introducing said thermal storage material from said thermal storage tank into a refrigerating apparatus, and a desupercooling apparatus for relieving the supercooled state of said thermal storage material supercooled below the freezing point in said refrigerating apparatus thereby allowing said thermal storage material to be returned to said thermal storage tank and wherein said thermal storage material consists of an aqueous solution prepared by dissolving in water one or more materials selected from the inorganic material group consisting of sodium formate (HCOONa), potassium formate (HCOOK), sodium acetate ($CH_3COONa$), magnesium acetate [$(CH_3COO)_2Mg$], potassium nitrate ($KNO_3$), calcium nitrate [$Ca(NO_3)_2$], sodium thiosulfate ($Na_2S_2O_3$), dipotassium hydrogen phosphate ($K_2HPO_4$), and urea [$(NH_2)_2CO$] or one or more materials selected from the organic material group consisting of gelatin, carboxymethylcellulose sodium salt, polyethylene glycol, and methyl cellulose in a concentration of 0.05 to 0.5 wt. %.

6. An ice thermal storage apparatus which comprises a thermal storage tank holding a thermal storage material, a thermal storage material introducing means of introducing said thermal storage material from said thermal storage tank into a refrigerating apparatus, and a desupercooling apparatus for relieving the supercooled state of said thermal storage material supercooled below the freezing point in said refrigerating apparatus thereby allowing said thermal storage material to be returned to said thermal storage tank and wherein said thermal storage material consists of an aqueous solution prepared by dissolving in water one or more materials selected from the inorganic material group consisting of sodium formate (HCOONa), potassium formate (HCOOK), sodium acetate ($CH_3COONa$), magnesium acetate [$(CH_3COO)_2Mg$], potassium nitrate ($KNO_3$), calcium nitrate [$Ca(NO_3)_2$], sodium thiosulfate ($Na_2S_2O_3$), dipotassium hydrogen phosphate ($K_2HPO_4$), and urea [$(NH_2)_2CO$] and one or more materials selected from the organic material group consisting of gelatin, carboxymethylcellulose sodium salt, polyethylene glycol, and methyl cellulose in a total concentration of 0.1 to 0.8 wt. %.

* * * * *